US005453768A

United States Patent [19]

Schmidlin

[11] Patent Number: 5,453,768

[45] Date of Patent: Sep. 26, 1995

[54] PRINTING APPARATUS WITH TONER PROJECTION MEANS

[76] Inventor: Fred W. Schmidlin, 8 Forestwood La., Pittsford, N.Y. 14534

[21] Appl. No.: 143,658

[22] Filed: Nov. 1, 1993

[51] Int. Cl.$^6$ .......................... G01D 15/16; G03G 15/06

[52] U.S. Cl. .......................... 347/55; 355/262; 355/265; 355/246

[58] Field of Search .......................... 346/159, 153.1; 347/55; 355/246, 247, 249, 259, 262, 265; 118/654, 647, 648, 651

[56] References Cited

U.S. PATENT DOCUMENTS

| | | | |
|---|---|---|---|
| 3,689,935 | 9/1972 | Pressman et al. | 346/159 |
| 3,914,771 | 10/1975 | Lunde et al. | 346/155 X |
| 4,164,372 | 8/1979 | Gundlach et al. | 355/246 |
| 4,282,303 | 8/1981 | Bergen | 118/648 X |
| 4,291,643 | 9/1981 | Kobayashi et al. | 118/647 X |
| 4,568,955 | 2/1986 | Hosoya et al. | 346/159 X |
| 4,994,859 | 2/1991 | Mizuno et al. | 355/247 |
| 5,175,070 | 12/1992 | Tanikawa et al. | 355/265 X |

*Primary Examiner*—Benjamin R. Fuller

*Assistant Examiner*—Randy W. Gibson

*Attorney, Agent, or Firm*—Robert J. Bird

[57] ABSTRACT

A direct electrostatic printing process which is insensitive to the polarity of the toner material is disclosed. The donor member of the printing apparatus includes alternate narrow and wide electrodes. The narrow electrodes are electrically pulsed to eject toner of one polarity in proximity with an array of electrically controlled apertures in a printhead, and unused toner are returned to the donor surface with low momentum to avoid dislodgment of other toner from the donor on impact. Toner ejection is accomplished with a three segment voltage pulse, including an impulse segment to detach toner of one polarity from the donor and accelerate the toner particles toward a printhead, a zero voltage segment during which the ejected toner drifts in the presence of electric fields produced by voltages applied to the printhead and toner receiving member, and a final low voltage segment of the same polarity as the first impulse segment to decelerate toner returning to the donor to a low landing speed and thereby avoid dislodgement of other toner from the donor. The donor structure and ejector pulse renders aperture type direct printing stable for long periods of time without frequent cleaning of the printhead.

8 Claims, 5 Drawing Sheets

PRINTING APPARATUS WITH TONER PROJECTION MEANS

BACKGROUND OF THE INVENTION

This invention relates to electrostatic printing devices and more particularly to means of projecting toner to an electronically addressable printhead for depositing toner in image configuration on plain paper substrates.

Of the various electrostatic printing techniques, the most familiar and widely used is xerography in which a latent electrostatic image is formed on a charge retentive surface, developed by a suitable toner material to render the image visible, and then transferred to plain paper.

Another form of electrostatic printing is one known as direct electrostatic printing (DEP). In DEP, unlike xerography, toner is deposited directly onto a plain (i.e., not specially treated) substrate in image configuration. This type of printing device is disclosed in U.S. Pat. No. 3,689,935 issued Sep. 5, 1972 to Gerald L. Pressman et al.

Pressman et al. disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is electrically isolated from every other segment of the segmented conductive layer. Selected potentials are applied to each of the segments of the segmented conductive layer while a fixed potential is applied to the continuous conductive layer. An overall applied field projects airborne charged particles through the row of apertures of the particle modulator and the density of the particle stream is modulated according to the pattern of potentials applied to the segments of the segmented conductive layer. The modulated stream of charged particles is intercepted by a print-receiving medium placed in the path of the modulated particle stream and translated relative to the particle modulator to provide line-by-line scan printing. In the Pressman et al. device the supply of the toner to the control member is effected with a uniform field which results in toner accumulations on the printhead, which disturbs the toner flow and produces irregularities in the printed image. High speed recording is difficult and moreover, the openings in the printhead are subject to clogging by the toner.

U.S. Pat. No. 4,491,855 issued on Jan. 1, 1985 in the name of Fujii et al. discloses a method and apparatus utilizing a controller having a plurality of openings or slit-like openings to control the passage of one-component insulative magnetic toner and to record a visible image by the charged particles directly on an image receiving member. Specifically disclosed therein is an improved device in which charged particles are supported on a supporting member and an alternating electric field is applied between the supporting member and the control electrode. Fujii et al. show an apertured printhead structure having wedge-shaped apertures wherein the larger diameter of an aperture is delineated by a signal or control electrode and is disposed opposite an image receiving substrate. Fujii et al. purports to obviate the problems noted above with respect to Pressman et al. and has allegedly made high-speed and stable recording possible.

U.S. Pat. No. 4,568,955 issued on Feb. 4, 1986 to Hosoya et al. discloses a recording apparatus wherein a visible image based on image information as formed on an ordinary sheet by a developer. The recording apparatus comprises a developing roller spaced at a predetermined distance from and facing the ordinary sheet and carrying developer thereon. It further comprises a recording electrode and a signal source connected thereto for propelling the toner on the developing roller to the ordinary sheet by generating an electric field between the ordinary sheet and the developing roller according to the image information. A plurality of mutually insulated electrodes are provided on the developing roller and extend therefrom in one direction. An A. C. and a D.C. source are connected to the electrodes, for generating an alternating electric field between adjacent ones of the electrodes to cause oscillations of the toner found between the adjacent electrodes along electric lines of force there between to thereby liberate the toner from the developer roll. In a modified form of the Hosoya et al. device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

U.S. Pat. No. 4,814,796 granted to Fred W. Schmidlin on Mar. 21, 1989 discloses a direct electrostatic printing (DEP) apparatus including a toner delivery system wherein a donor roller is employed to present charged toner to an apertured printhead, toner being deposited on the donor roller via a magnetic brush structure. The donor roller is positioned adjacent the printhead structure to form a nip area therebetween. The toner on the donor roller is excited into a cloud-like state in the nip area via an A. C. voltage applied between the donor roller and the shield electrode of the apertured printhead. A two-component magnetic brush is used to deposit toner on the donor roller because the toner charge distribution of the charged toner is most nearly unipolar in magnetic brushes. In operation of the DEP apparatus, the toner predominantly charged to the one polarity, referred to as the right sign toner, is passed through an aperture and deposited on the receiver substrate, such as plain paper, to print black. The control electrode and the paper shoe are set to voltages opposite in polarity to the charge on the right sign toner. The voltage of the paper shoe is made to be much greater than the voltage on the control electrode so the right sign toner is attracted to the paper shoe and not to the control electrode. To stop the passage of toner through an aperture the control electrode is switched to a large voltage the same polarity as the right sign toner. This repels the right sign toner and forces it back toward the donor. Under these conditions no toner deposits on the paper and it remains white. The control electrode is then said to be in the OFF state. In this OFF state any toner in the toner cloud in front of the aperture which is opposite in polarity to the right sign toner, referred to as the wrong sign toner (WST), will be drawn through the aperture and collected on the control electrode. The WST does not deposit on the paper because the paper shoe is the same polarity as the WST and therefore repels the WST away from the paper. Thus, collection of WST on the control electrode does not directly impact image quality and might not even be recognized as a problem. The presence of WST on a control electrode manifests itself as a problem when an aperture is maintained in the OFF condition for extended periods of time, as needed to print large white areas. Then, relatively large amounts of WST accumulate on the control electrodes and the electrostatic charge associated with these accumulations produces an electric field that counters the working field produced by the control voltage. Eventually, this counter field negates enough of the control field to enable right sign toner to leak through the aperture. This toner does land on the paper, where it produces a noticeable, unwanted, gray background.

The foregoing discussion explains the fundamental reason why DEP requires the use of a magnetic brush which contains a very low concentration of WST. With a sufficiently low amount of WST in the toner supply it is possible to maintain a control electrode in the OFF state for one page length without producing a noticeable level of gray background. The printhead can then be restored to a clean state between pages using a cleaning process such as that described in U.S. Pat. No. 4,755,837, invented by Fred W. Schmidlin et al..

By way of example, a DEP apparatus designed to work with negative toner may utilize a paper shoe set to +400 volts and control electrodes biased to +50 Volts in the ON state and −350 volts in the OFF state. In this case, the positive wrong sign toner will be repelled from the paper shoe and attracted to the negative control electrode in the OFF state. With these operating voltages it is known that an 11 inch length of white with no noticeable background can be printed if the quantity of wrong sign toner that flows to the control electrodes in the OFF state is less than 0.2% of the right sign toner that flows to the paper in the ON state.

It may be appreciated from the above example that the tolerance of DEP for wrong sign toner is extremely low. It may also be appreciated that the required level of wrong sign toner is achieved only with the highest quality of two-component xerographic developers such as that found in Xerox 9200 laser printers. It is also known that the proportion of wrong sign toner present in a magnetic brush developer increases with use. Thus the length of time a magnetic brush can be used to deposit toner on a DEP donor roll is severely limited. Therefore it would be a great advantage to have a direct printing process which is much less sensitive to the presence of wrong sign toner, a process which could use a wider variety of xerographic developers with long life, and would eliminate the need to clean the printhead after every page.

BRIEF DESCRIPTION OF THE INVENTION

The present invention provides a toner delivery system on one side of a printhead, and an electrically biased shoe or electrode on the opposite side of the printhead. The toner delivery system includes a novel donor structure comprised of narrow linear electrodes interpositioned between wider linear electrodes in such a way as to produce an intense electric field above the narrow electrodes while the reverse directed field above the wider electrodes is maintained at a much reduced intensity. More specifically, the electrode widths and spacings are chosen so that the electric field acting on one polarity of toner that resides on or above the narrow electrodes can be made to exceed the threshold for release of said toner while the reverse directed field acting on the opposite polarity toner residing on the donor above the wider electrodes is maintained below the threshold for release. A D.C. voltage may also be applied to the wider electrodes to assist achievement of said release conditions. Said donor structure facilitates ejection of predominantly one polarity of toner from the donor despite the presence of both polarities on the donor. This donor structure also enables the generation of much more intense fields than can be achieved with the conventional uniform donor electrode. While all the field lines will be commonly directed from a uniform electrode it is difficult with uniform electrodes to achieve sufficient field strength for efficient toner ejection without exceeding the breakdown strength of air. With alternate narrow and wide electrodes as disclosed above, the length of the field lines of high intensity is made relatively short, which is known in the field of electrostatics to defer air breakdown to much higher field strengths. The donor is comprised of three or more narrow electrodes with a spacing identical to the spacing between the rows of apertures in the printhead. The narrow electrodes in the donor are aligned with the apertures in the printhead so as to efficiently project equal amounts of toner into proximity with each row of apertures.

A second important feature of the present invention concerns the time dependence of the ejector voltage pulse applied to a narrow electrode, referred to henceforth as an ejector electrode. This ejector pulse forces release of only the predominant polarity toner from the donor. To eject this toner, henceforth referred to as the right sign toner (RST), from the donor, an intense electric field is created above the ejector electrode by applying a high voltage for a short period of time, typically less than 10 microseconds. This field overcomes the adhesion of the RST to the donor and accelerates them in a trajectory toward the printhead. The ejector voltage is then set to zero for a period of time, during which the only field acting on the toner is supplied by the paper shoe and control electrodes of the printhead. If the control voltage applied to a local aperture of the printhead is turned ON, the launched toner will continue to be accelerated by the control field and the toner will pass on through the printhead and deposit on the receiver medium. If the control electrode of a local aperture is turned OFF, the net field on the toner will act to decelerate the toner particles and force them to turn back toward the surface of the donor. At the appropriate time, while the toner are moving toward the donor, the ejector voltage is again turned back to the initial polarity but to a much lower magnitude to slow the speed of the speed of the toner as they land on the surface of the donor, or on top of other toner residing on the donor. The landing of the toner returning to the donor with little or no momentum is important to avoid release of secondary toner from the donor via momentum transferred from the returning toner to other toner on impact. The provision of means to project toner of only one polarity into proximity with the apertures of a printhead and the return of any unused toner to the donor with less momentum than required to dislodge other toner from the donor, especially WST, is a key aspect of this invention. An ejector pulse designed to achieve unipolar toner ejection followed by a "soft landing" will generally be comprised of three sequential pulse segments: 1) an initial pulse segment of high voltage, approaching but not reaching electrical breakdown, of short duration, typically a few microseconds; 2) a second pulse segment of zero volts wherein the toner launched during the first segment drift in the field produced by control electrode and paper shoe alone; and 3) a final pulse segment of low voltage the same polarity as the voltage of the initial segment and initiated in time to softly land any unused toner without dislodging any secondary toner from the donor. A detailed description of a an appropriately designed ejector pulse is provided hereinafter.

Several important advantages over the prior art of direct electrostatic printing ensue from this invention. It eliminates, or greatly reduces the tendency for WST to collect on the printhead which degrades the quality of the printed image an eventually leads to clogging of the printhead apertures. It eliminates the need to clean the printhead after every page which is cumbersome and adds to the cost of a printer. It enables 4X1 or higher levels of multiplexing with an easy-to-fabricate printhead and thus provides a way to construct personal printers at low cost. It enables the use of low cost single-component nonmagnetic xerographic development systems in the toner delivery system.

It will be appreciated that the present invention overcomes all the shortcomings of the prior art known as direct electrostatic printing (DEP) while preserving all the fundamental advantages that ensue from the use of small dry particles as the imaging medium. Direct projection of toner particles less than 10 microns in diameter is vital to both the formation of continuous tone pictorial images and the immediate superposition of different colorants on plain paper substrates. These are both key to the formation of quality color images at low cost. No other known technology can do this.

DETAILED DESCRIPTION OF THE DRAWINGS

FIG. **3*a*** illustrates a representative acceleration (or force to mass ratio) characteristic required to eject RST from the donor and return unused toner with low impact momentum.

Figure 3A:
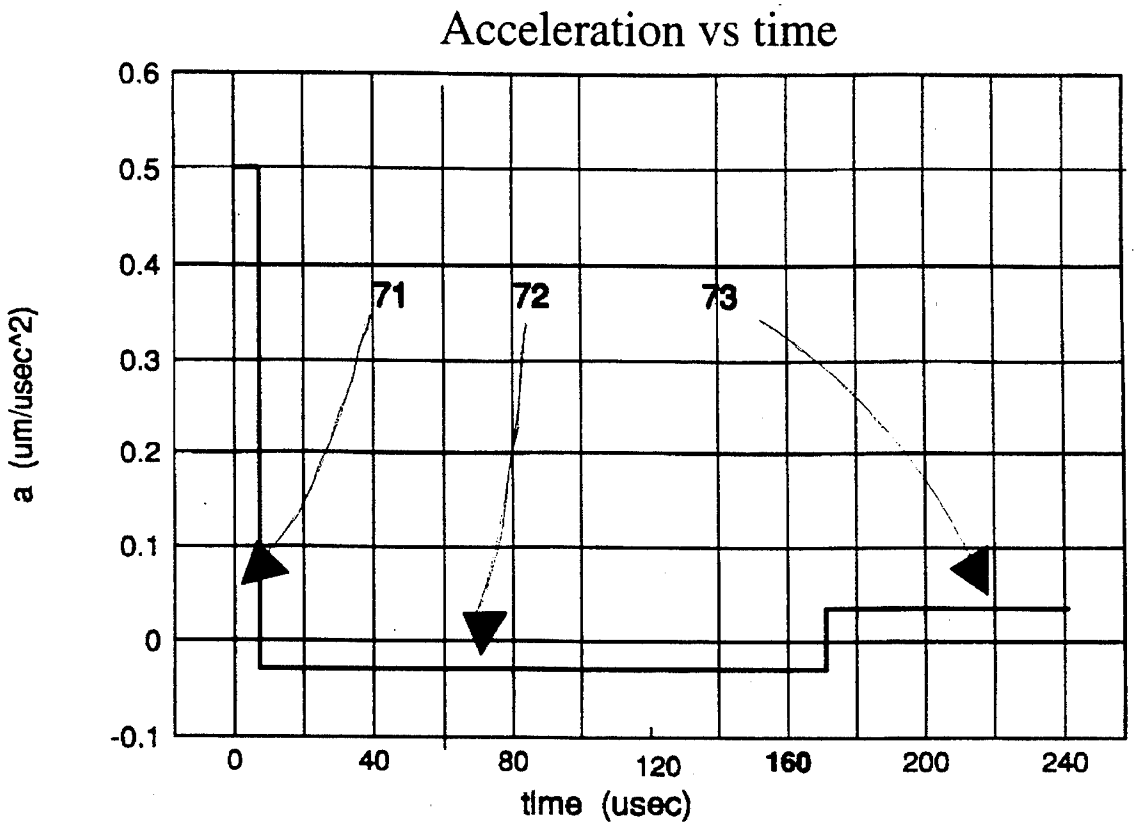

FIG. **3*b* illustrates the toner trajectory produced by the acceleration characteristic illustrated in FIG. 3*a***.

Figure 1:
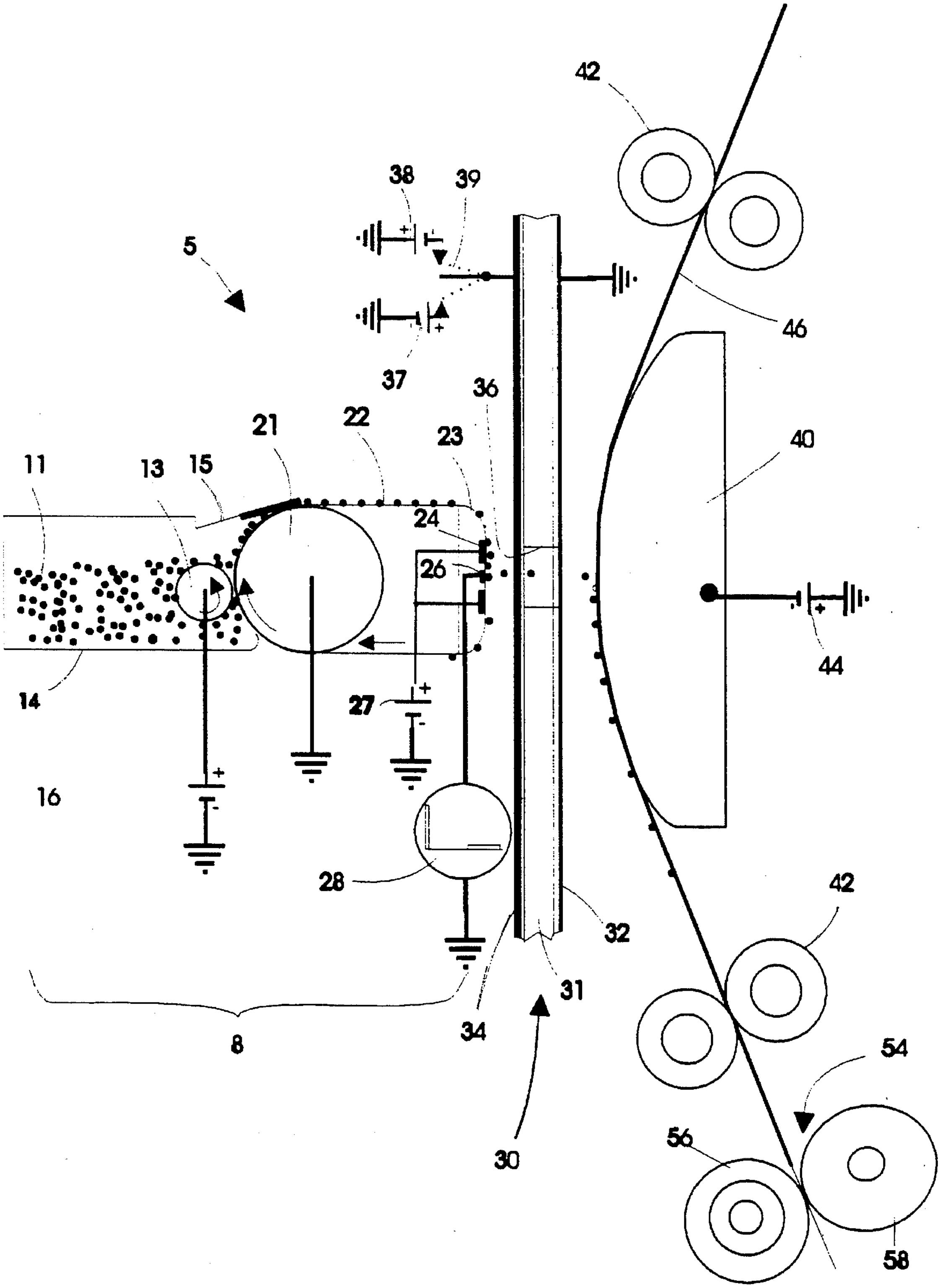
FIG. 1 is a schematic diagram of the system and process of this invention.
Figure 4:
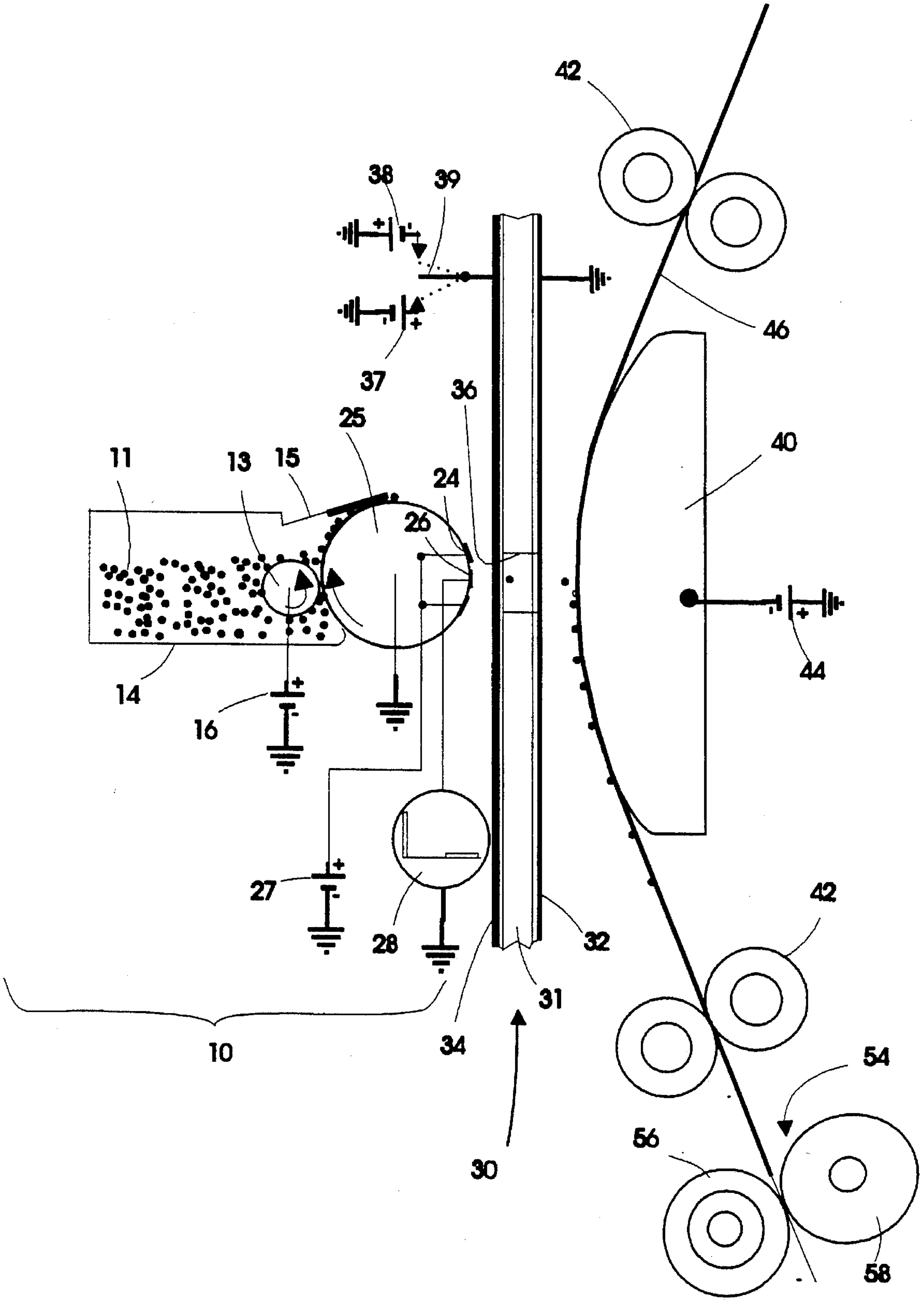

FIG. 4 is a schematic diagram of a second embodiment of this invention in which the donor belt in FIG. 1 is replaced by an electroded donor roll.

Figure 5:
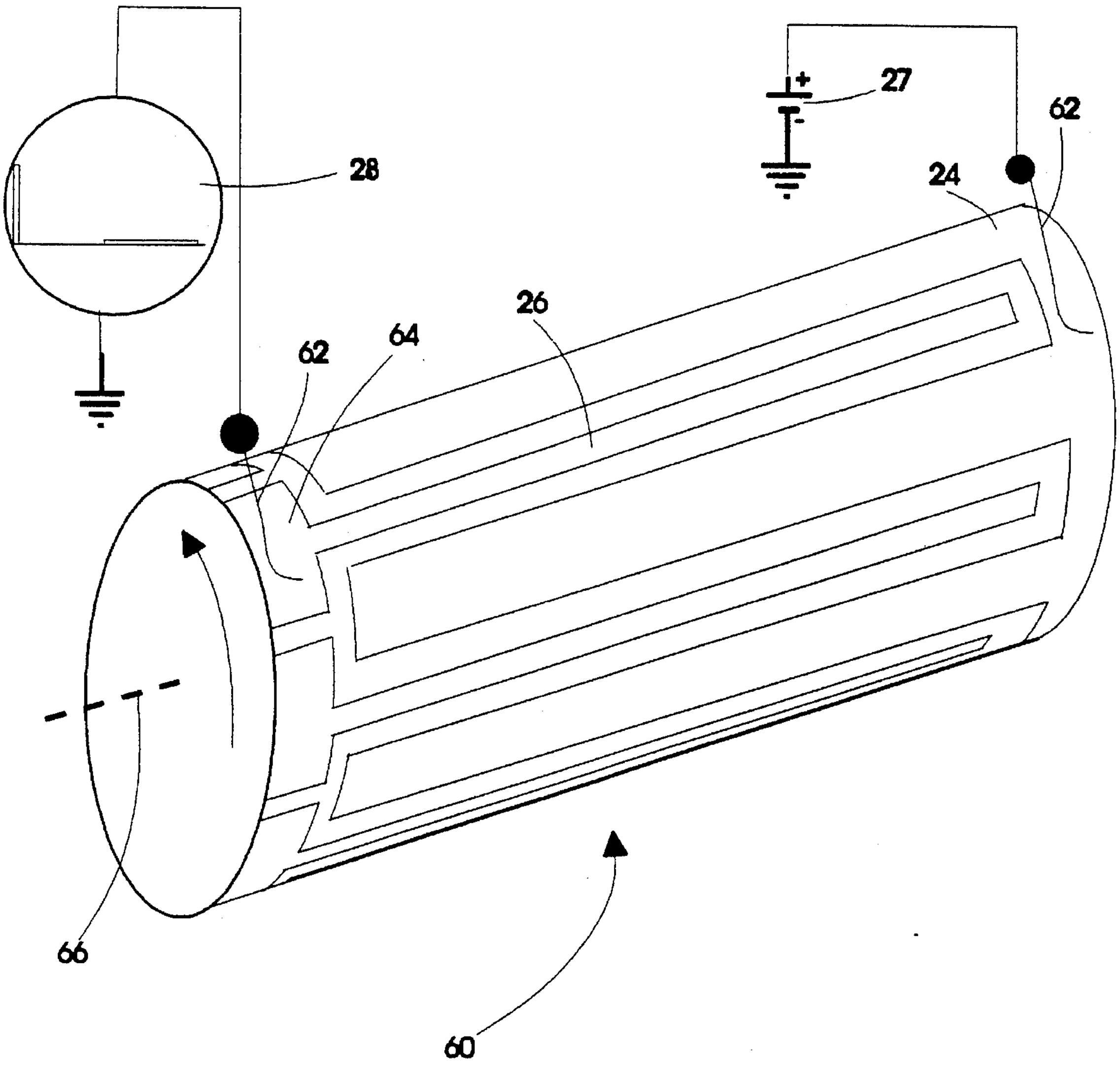

FIG. 5 is an enlarged three dimensional view of the electroded donor roll in FIG. 4.

DETAILED DESCRIPTION OF THE INVENTION

Referring now to FIG. 1 a printing apparatus generally indicated at 5 includes a toner delivery system 8, a printhead structure 30, and a backing electrode or shoe 40.

The toner delivery system 8 includes a moving donor belt 22 entrained about a drive roller 21 and a stationary donor mandrel 23. Toner 11, contained in housing 14, is charged and uniformly spread over the surface of the moving belt via the combined action of the biased preload roll 13 and the charging metering blade 15. The belt transport system may optionally include one or more idler rolls and a belt tracking device, not shown. Toner may be applied to the belt with any xerographic development system ordinarily used to apply toner to a xerographic photoreceptor. The toner delivery system 8 illustrated in FIG. 1 is a modified form of a single component development system in which the conventional donor roll is replaced by a belt drive roll and moving belt. This makes it possible to transport the toner over the stationary mandrel 23 and especially the stationary electrodes 24 and 26 attached to the stationary mandrel 23. The use of a single component development device to apply toner to the belt is preferred over the two component variety, such as a magnetic brush, because it avoids the possibility of bead carry out which can damage printhead 30.

The donor belt is a charge relaxable dielectric material such as carbon loaded Tedlar or polyimide. The thickness of the donor belt is less than 100 microns and preferably less than 30 microns. The drive roll 21 is conductive and electrically grounded to serve as a reference electrode for voltage source 16 that is used to control the toner charge acquired via preload roll 13. The polarity of voltage source 16 is identical to the polarity of the toner, which is assumed to be predominantly positive for the example presently illustrated. The layer thickness of toner applied to the donor belt is typically about 1 mg/cm$^2$ and the toner charge-to-mass ratio may range from 5 to 20 μC/gm.

The donor mandrel 23 is comprised of alternately wide and narrow electrodes, 24 and 26 respectively, separated by dielectric spaces that are comparable in width to the narrow electrodes 26. The narrow electrodes 26, referred to as ejector electrodes, are used to detach toner from the donor belt and project it into proximity with the apertures in the printhead 30. The narrow electrodes 26 are thus spaced equally to the distance between the rows of apertures 36 in the printhead 30 and aligned to maximize the amount of toner that can be made to pass through the apertures when the apertures are appropriately biased as explained below. The wide electrodes 24, referred to as reference electrodes, are at least twice the width of the ejector electrodes 26 and typically fill the remaining space between the ejector electrodes.

Figure 2:
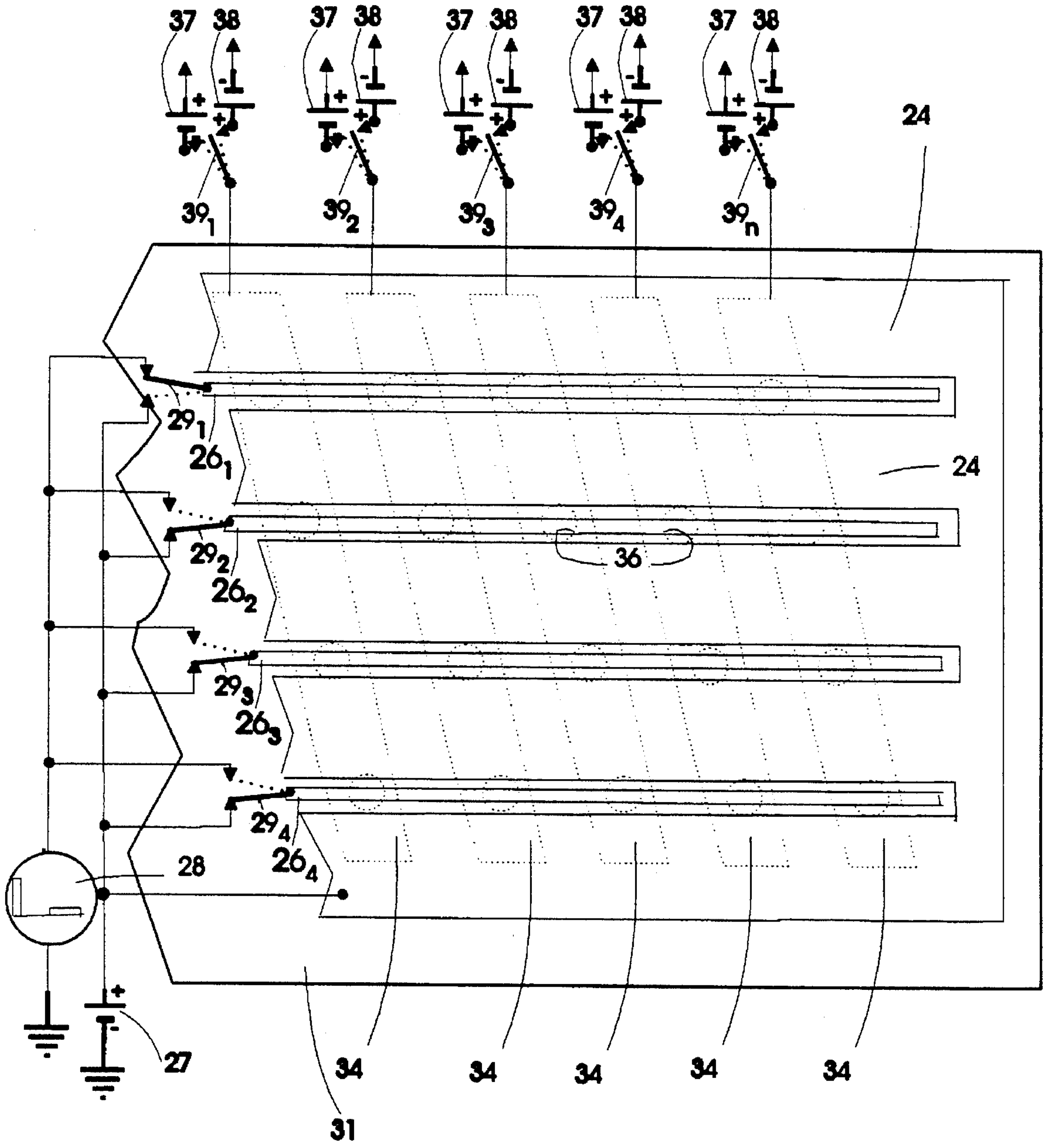
FIG. 2 is an enlarged plan view of the donor structure with the control electrodes and apertures of a multiplex printhead (shown dashed) projected on top to show the alignment of the ejector electrodes with the aperture rows.

The relationship between the electrodes in the donor mandrel 23 and the printhead 30 is further illustrated via the plan view shown in FIG. 2. This figure shows the reference electrodes 24 interconnected at one end and electrically connected to a D.C. voltage source 27. The voltage of source 27 ranges between 0 and 100 volts depending upon the electrode widths and magnitude of the toner charge. The polarity of source 27 is the same as the predominant charge of the toner. In general, the magnitude of source 27 is fine tuned to provide the maximum latitude for ejection of RST from above the ejector electrodes 26 while avoiding ejection of WST from above the reference electrodes 24. Bias 27 also serves to assist attraction of unused toner back to the same general area of the donor from which it was ejected. FIG. 2 also shows the positioning of the control electrodes 34 and apertures 36, both members of the printhead 30, in relation to the ejector electrodes 26 in the donor mandrel 23. It can also be seen more clearly in FIG. 2 that the width of the ejector electrodes 26 is approximately ½ the diameter of the apertures 36 and centered under the rows of apertures. The electrical connections to ejector electrodes 26 are dependent on the mode of operation.

In the 4X-multiplex mode, illustrated in FIG. 2, the ejector electrodes $\mathbf{26_1}$ through $\mathbf{26_4}$ are connected in sequence via switches $\mathbf{29_1}$ through $\mathbf{29_4}$ to pulse generator 28. For one "pixel time", or the application of one complete ejector pulse to be explained in detail later on, switch $\mathbf{29_1}$ is connected to pulse generator 28 while switches $\mathbf{29_2}$, $\mathbf{29_3}$ and $\mathbf{29_4}$ are connected to voltage source 27. For the next pixel time switch $\mathbf{29_2}$ is connected to pulse generator 28 and switch $\mathbf{29_1}$ is connected to voltage source 27. For the third and fourth pixel times switches $\mathbf{29_3}$ and $\mathbf{29_4}$ are similarly switched to pulse generator 28 in sequence for one pixel time and then back to the voltage source 27. Thus toner is projected into proximity with the apertures one row at a time from above ejector electrodes $\mathbf{26_1}$ through $\mathbf{26_4}$ in repeated cycles. The reference electrode 24 is connected to voltage source 27 at all times. The control electrodes 34 for the multiplex mode are skewed columns 1, 2, 3, . . . , n extending across all rows of apertures in the manner shown. Each control electrode is connected through switches $39_1$ through $39_n$, covering the full print width, to either voltage source 37 or voltage source 38 depending on whether or not the apertures controlled by the electrode are allowed to pass toner through the aperture and deposit on the receiver sheet 46. Toner is allowed to pass through an aperture when the electrode is connected to voltage source 37 or repelled back toward the donor when the electrode is connected to voltage source 38. Correspondingly, the control electrode is said to be ON or OFF. Switches 39 are synchronized with the switches 29 to control the passage of toner through the one row of apertures corresponding to the ejector electrode being energized. The state of the control voltage for the other rows of apertures is irrelevant because no toner is projected into proximity with them at the same time. Thus the control switches $39_1$ through $39_n$ are simultaneously set for row 1, then row 2, and so on as the ejector electrodes are fired in the same sequence. After one complete cycle (4 pixel times), black dots, or pixels, appear on the receiver sheet 46 opposite all apertures that were turned ON during that cycle. Due to focusing of the toner by the electric field near an ON aperture, the diameter of a pixel is approximately ½ the diameter of an aperture. Each cycle the receiver sheet 46 is advanced one pixel diameter. Then the cycle is repeated. By proper programming of switches 39 any desired pattern of dots can be printed on the receiver sheet. Any electronic system known in the art of electronic printing can be used to time the control switches and ejector pulses.

It will be appreciated that different levels of mutiplexing are possible. For example, 2-fold mutiplexing can be achieved by splitting the control electrodes 34 between rows 2 and 3 and attaching a second row of switches 39 to the opposite outside end of the control electrodes. Compared to the 4-fold example discussed above, this requires twice as many switches 39 but enables printing at twice the speed. Similarly, 3, 6, 8, or higher levels of mutiplexing are possible by using 6, 8 or more rows of apertures. These higher levels of multiplexing are best facilitated with the belt type electrode which provides for a uniform space between the donor and printhead over extended distances.

The simplex mode (or 1-fold multiplexing) which enables the highest print speed, requires a printhead in which every aperture is electrically isolated and connected to its own electronic switch. All the ejector electrodes are then connected in common to a single pulse generator 28. This will enable the highest speed printing but requires the largest number of control switches—one for each aperture.

Returning to FIG. 1, only one row of apertures 36 is indicated to simplify the sketch. In general the printhead will have at least three rows of apertures and preferably four or more. The surface of the donor mandrel 23 is smooth and contact between the donor electrodes 24, 26 and belt 22 is maintained at all times. This may be accomplished with belt tension and a slight curvature to the mandrel surface, or by means of a vacuum hold down, not shown. For the case of a curved mandrel surface, variations in gap between the belt and printhead may be compensated by adjustment of the ejector voltages applied to the different ejector electrodes. The spacing between the belt and printhead ranges between 70 and 400 microns.

The aperture plate, or printhead, 30 may be any of the structures described in prior art, such as that disclosed in the Pressman U.S. Pat. No. 3,689,935, and comprised of a layered member including a dielectric base member 31, fabricated from a polyimide film approximately 25 microns thick. The base member is clad on one side thereof with a continuous conductive layer, or shield, 32 of metal such as aluminum approximately 1 micron thick. The opposite side of the base member 31 carries segmented conductive layer or control electrode 34 thereon which is also fabricated from metal such as aluminum. The control and shield electrodes may be interchanged, i.e., with the shield electrode opposite the toner supply, though the preferred arrangement is as indicated. A plurality of holes or apertures 36 arranged as in FIG. 2 (only one of which is shown in cross section in FIG. 1) approximately 150 microns in diameter extend through the base 31 and the conductive layers 32 and 34. With the shield grounded and the control electrode at –30 volts, toner ejected from the donor belt with ejector pulse 28 will pass on through the aperture 36 and be attracted toward paper shoe 40, which is biased to –400 volts via the D. C. supply 44. When control electrode 34 is switched to 220 volts via the electronically controlled switch 39, toner ejected from the donor belt 22 is prevented from passing through aperture 36. Toner allowed to pass through an aperture is intercepted by recording medium 46 which is transported by edge transport roll pairs 42. With properly timed switching of all apertures, any desired image can be formed on recording medium 46. The printed toner image is finally affixed to the recording medium permanently by passing the recording medium through the fuser, indicated generally by reference number 54. Fuser 54 may include a heated fuser roller 56 adapted to be pressure engaged with backup roller 58. However, it will be appreciated that any fuser known in the art of xerography will work satisfactorily.

The novel printing process described above includes two key features requiring further detailed description. These concern the design of the donor structure and the temporal shape of the ejector pulse provided by the special generator 28. Both features are crucial to achieve the objective of leaving all, or nearly all, WST attached to the donor via the toner-donor adhesive force, $F_a$, while effecting release of RST by applying a strong QE ejection force. Here Q is the charge on the toner and E is the electric field acting on the toner in contact with the donor. As will be appreciated by those skilled in electrostatics, E is determined everywhere over the surface of the donor by the geometry of the donor electrodes, their spacing from the printhead and the voltages applied to the donor electrodes.

The design of the donor structure is optimally determined for the materials in use, especially the toner which establishes ranges of values for Q and $F_a$. The widths of the ejector and reference electrodes and the magnitude of the voltages applied thereto are chosen so that E above the activated ejector electrodes is greater than $F_a/Q$ for the majority of RST while E above the reference electrodes is less than Fa/Q for the WST at all times. This condition can be achieved in two ways: 1) a toner material may be chosen so that Q for all the WST, denoted $Q_w$, is small compared to Q for the RST (denoted $Q_r$); or 2) the maximum E above the reference electrodes 24 is always much less than the maximum E above the ejector electrodes 26. The latter condition is preferred because it provides the freedom to use a wider variety of toner materials and enhances the working latitude for any toner material. The ratio of the fields above the ejector and reference electrodes is controlled in pan by the ratio of the widths of the ejector and reference electrodes 26, 24. To achieve the desired effect the reference electrode 24 is made at least twice the width of the ejector electrode 26. The width of the ejector electrode 26 is also made less than the diameter of the apertures 36 as well as the spacing between the donor mandrel 23 and printhead 30. The width of the insulator between the ejector and reference electrodes is made greater than or equal to the width of the ejector electrodes. The optimal donor structure can be determined via the process of analysis and experimentation, aided by preliminary experiments to determine the critical fields for detachment of RST and WST from the donor.

In addition to the donor structure discussed above, the second important feature of this invention concerns the time dependent shape of the voltage pulse to be applied to the ejector electrodes. This ejector pulse includes three distinct time intervals. During the first time interval, called the impulse or launch time, RST are ejected from the donor and launched into one of two distinct types of trajectory depending on whether the control electrode 34 is ON or OFF. If the control electrode 34 is ON the toner passes on through the aperture and lands on the receiver sheet. If the control electrode 34 is OFF, the toner turns around and returns to the donor belt 22. The particular shape of this return trajectory is crucial and is the primary determinant of the ejector pulse shape. To control as many toner as possible the launch voltage is made as large as possible, short of electrical breakdown—in the neighborhood of 10 volts/micron. The duration, typically 5 to 10 microseconds, is made long enough to impart sufficient impulse to detach the majority of the toner above the ejector electrode 26. For the second time interval the ejector voltage is set to zero. During this time the toner drifts against the force field produced by the voltages on the control electrode 34 and paper shoe 40. Since the net force is toward the donor by design, the toner will reach a maximum trajectory height and then fall back toward the donor. For the third and final time interval the ejector voltage is set to the same polarity as during the launch but to a low level in order to slow the velocity of the returning toner to a low value at the moment they land on the donor. This "soft landing" is crucial to avoid dislodgment of other toner, including especially the WST, from the donor due to momentum transfer on impact. This is crucial to avoid production of airborne WST and fouling of the printhead 30. The drift and landing time intervals will typically range between 50 and 200 microseconds depending on the toner material. The optimal time intervals as well as the magnitude of the retro-force are determined by analysis and experimentation for each toner material.

The ejector pulses are synchronized to the control voltages to begin in coincidence with, or slightly after, the beginning of a control cycle for each pixel time. The speed of the donor belt 22 is at least five times the paper speed and preferably 10 times the paper speed to provide an undisturbed layer of toner on the donor for every ejection pulse.

Figure 3B:
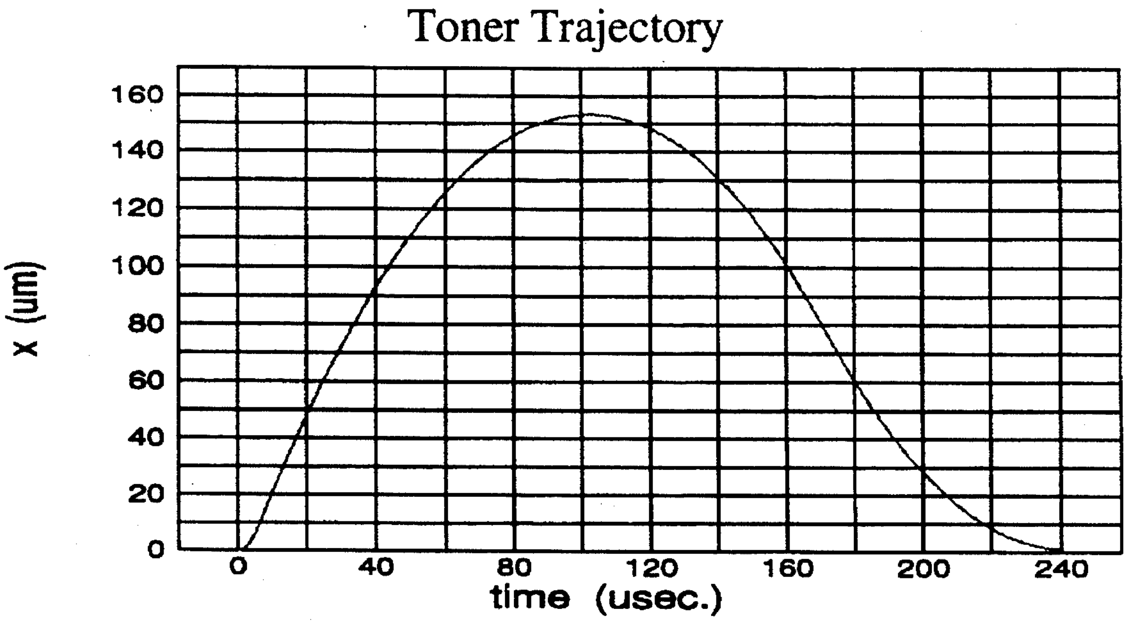

A detailed example of the force field and time intervals required to produce the desired trajectory is illustrated in FIGS. 3*a* and 3*b*, assuming a simplified one dimensional geometry (plane parallel electrodes). FIG. 3*a* is a plot of toner acceleration versus time, resulting in the trajectory plotted in FIG. 3*b*. This is a simulation of the resultant force due to the combined effects of the voltages on the control electrode 34 (in the OFF state), paper shoe 40, ejector electrode 26 and reference electrode 24. The net force produced by the ejector voltage alone can be obtained from this by shifting the origin of the abscissa to make the drift force zero. This follows from the fact that the only time varying contributor to the net force is the ejector voltage which is zero during the drift interval. The characteristic features of this trajectory of importance are its maximum height and near zero slope (or velocity) at the donor surface (at z=0). The three distinguishable acceleration (or force) periods that produce this trajectory can be readily identified in FIG. 3*a*. The three contiguous time periods that characterize this invention are the strong impulse period 71, followed by the drift period 72, and finally the landing period 73. These emanate from the ejector voltage pulse comprised of a large initial spike, followed by zero voltage and terminated by an extended application of a voltage of the same polarity as the initial spike but less than half its magnitude. It will be appreciated that apart from the general identifiable features just stated, the applied force required to produce the desired trajectory is not unique. For example any launch pulse imparting approximately the same impulse (amplitude times duration) to the particle will be equivalent, and any landing pulse shape that will return the particle to the donor surface with insufficient momentum to dislodge other toner is equivalent. However, the broad characterizing features identified above are universally required to achieve the desired effects. A specific example of an ejector pulse that will produce the desired trajectories for toner having a typical average charge-to-mass ratio of 20 μC/gm, and used in conjunction with a printhead with 220 volts on the control electrode and spaced 200 microns from the donor, is: 600 volts for 6 μsec, followed by zero volts for 170 μsec, followed by 160 volts for 70 μsec. This ejector pulse is constructed for ejector electrodes that are 50 microns wide and spaced 50 microns from the reference electrodes. The latter are biased to 100 volts.

All ejector pulses comprised of the three aforementioned time intervals designed to propel toner into proximity with a printhead and return unused toner to the donor with low momentum are considered within the spirit of this invention.

A remarkable property of the proposed ejector pulse is its independence of the toner charge-to-mass ratio. The predominant forces scale with the toner charge-to-mass ratio, which results in a proportional trajectory of the same general shape. Thus the dispersion of charge-to-mass ratios that exist in a typical toner material and the toner image force will simply result in a dispersion of toner projection heights. The trajectories will all terminate with soft landings, which is the key attribute of crucial importance.

An alternative embodiment of this invention results from the replacement of the belt type toner delivery system in FIG. 1 with an electroded donor roll as indicated schematically in FIG. 4. Here the ejector electrodes 26 and reference electrode 24 are embedded in, or bonded to, the surface of the donor roll 25. A more detailed but highly magnified view of the donor roll and electrode arrangement is shown in FIG. 5. All the electrodes are electrically insulated from the from the body of the roll and the ejector electrodes 26 are extended and widened at one end of the roll to form contact pads 64. The reference electrodes 24 are extended on the opposite end and joined to a common contact pad that completely encircles the roll. The roll is rotated about axis 66 with a suitable drive motor, not shown, and is positioned so the spacing between the roll and printhead ranges from 50 to 300 microns, and preferably between 100 and 200 microns. Electrical connections are made to the moving electrodes via sliding spring contacts 62, which are positioned for the case of the ejector electrodes to make contact just prior to application of an ejector pulse. The ejector electrodes 26 may be activated in many different ways, but it is preferable to launch toner from a given electrode only once per rotation. In this case a different spring contact is required for each row of apertures though not shown in the figures. The ejector electrodes 26 are activated in sequence as they move past the rows of apertures 36 in the printhead 30. The distance between neighboring ejector electrodes 26 is determined in general by the distance between the aperture rows and the speed of the donor roll 25. For example, if the distance between the aperture rows neighboring ejector electrodes are both made to be 4.25 pixel diameters, an acceptable donor roll speed is 8.5 pixel diameters, or two row spaces, per pixel time. But it will be appreciated that many different procedures can be devised for moving the donor and firing the ejector electrodes without changing the spirit of this invention.

The surface of the donor roll, except for the contact pads is preferably overcoated with a thin charge relaxable dielectric layer such as carbon loaded Tedlax or polyimide. The thickness of the overcoating is less than 50 microns and preferably less than 20 microns. Toner is loaded onto the coated surface in the same manner as in the case of the belt donor. Alternatively, toner may be coated on the donor by any means successfully utilized for the development process in the art of xerography.

What is claimed is:

1. Printing apparatus including a toner delivery system, a backing electrode, and a printhead disposed between said toner delivery system and said backing electrode:

said toner delivery system including a toner reservoir, a conveyor to convey toner from said reservoir, a plurality of ejector electrodes operatively connected to said conveyor and to a source of pulsed direct-current voltage, ejector electrode switching means to selectively energize said ejector electrodes to selectively eject toner of one polarity from said conveyor toward said printhead, and reference electrodes adjacent to said ejector electrodes and of greater width than said ejector electrodes;

said printhead including a plurality of control electrodes, a plurality of toner apertures, and control electrode switching means to selectively set the voltage of said control electrodes to selectively pass toner through said toner apertures;

said backing electrode supporting a recording medium for movement past said printhead, and electrically biased to attract toner from stud printhead.

2. Printing apparatus as defined in claim 1 wherein the width of said reference electrodes are greater than twice the width of said ejector electrode.

3. Printing apparatus as defined in claim 1, further including a pulse generator operatively connected to said ejector electrodes through said ejector electrode to provide a three segment ejector voltage pulse to said ejector electrodes to energize: the ejection of toner thereform.

4. Printing apparatus as defined in claim 3, in which said ejector voltage pulse includes a first pulse segment of high voltage and of :short duration to detach toner of one polarity from said conveyor, a second pulse segment of zero voltage and of sufficient duration to permit reversal in direction of motion of ejected toner repelled by said printhead., and a third pulse segment of lower voltage than said first pulse segment and of sufficient duration to decelerate toner returning to said conveyor to a low landing speed to avoid dislodgment of other toner from said conveyor.

5. Printing apparatus as defined in claim 4, in which said third pulse segment is of the same polarity and less than half the voltage of said first pulse segment, and longer than twice the duration of said first pulse segment.

6. A method of printing, including the following steps:

conveying toner on a conveyor from a toner reservoir to ejector electrodes;

selectively energizing said ejector electrodes with a three segment voltage pulse to selectively eject toner of one polarity from said conveyor toward an apertured printhead;

selectively applying voltage on control electrodes on said printhead to selectively pass through said printhead; and attracting said toner from said printhead to a recording medium moving past said printhead.

7. A method of printing as defined in claim 6, in which said three segment voltage pulse includes:

a first pulse segment of high voltage and of short duration to detach toner of one polarity from said conveyor, a second pulse segment of zero voltage and of sufficient duration to permit reversal in direction of motion of ejected toner repelled by said printhead, and a third pulse segment of lower voltage than said first pulse segment and of sufficient duration to decelerate toner returning to said conveyor to a low landing speed to avoid dislodgment of other toner from said conveyor.

8. A method of printing as defined in claim 6, in which said ejector electrodes are selectively energized one at a time to project toner of one polarity toward one row of apertures in said printhead, and a plurality of segmented control electrodes, each controlling one aperture in each row of apertures in said printhead, selectively set simultaneously to control passage of toner through the row of apertures receiving toner from said energized ejector electrode.

* * * * *